May 31, 1960

J. W. MEACHAM ET AL 2,938,971

PLUG-IN BUSWAY SYSTEM

Filed Nov. 21, 1958

INVENTORS
JOHN W. MEACHAM,
CECIL B. TURTON
BY Robert T. Casey
ATTORNEY

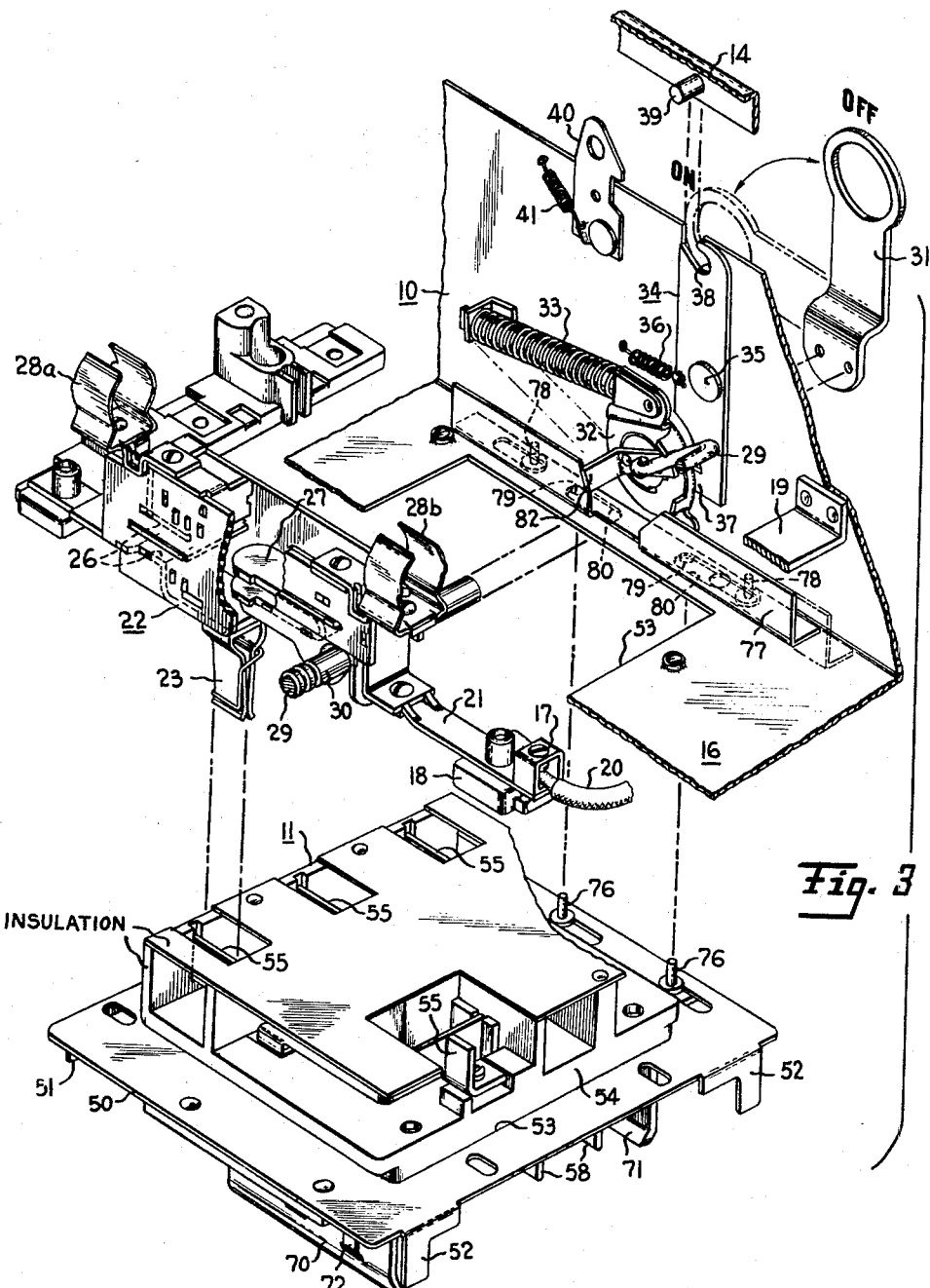

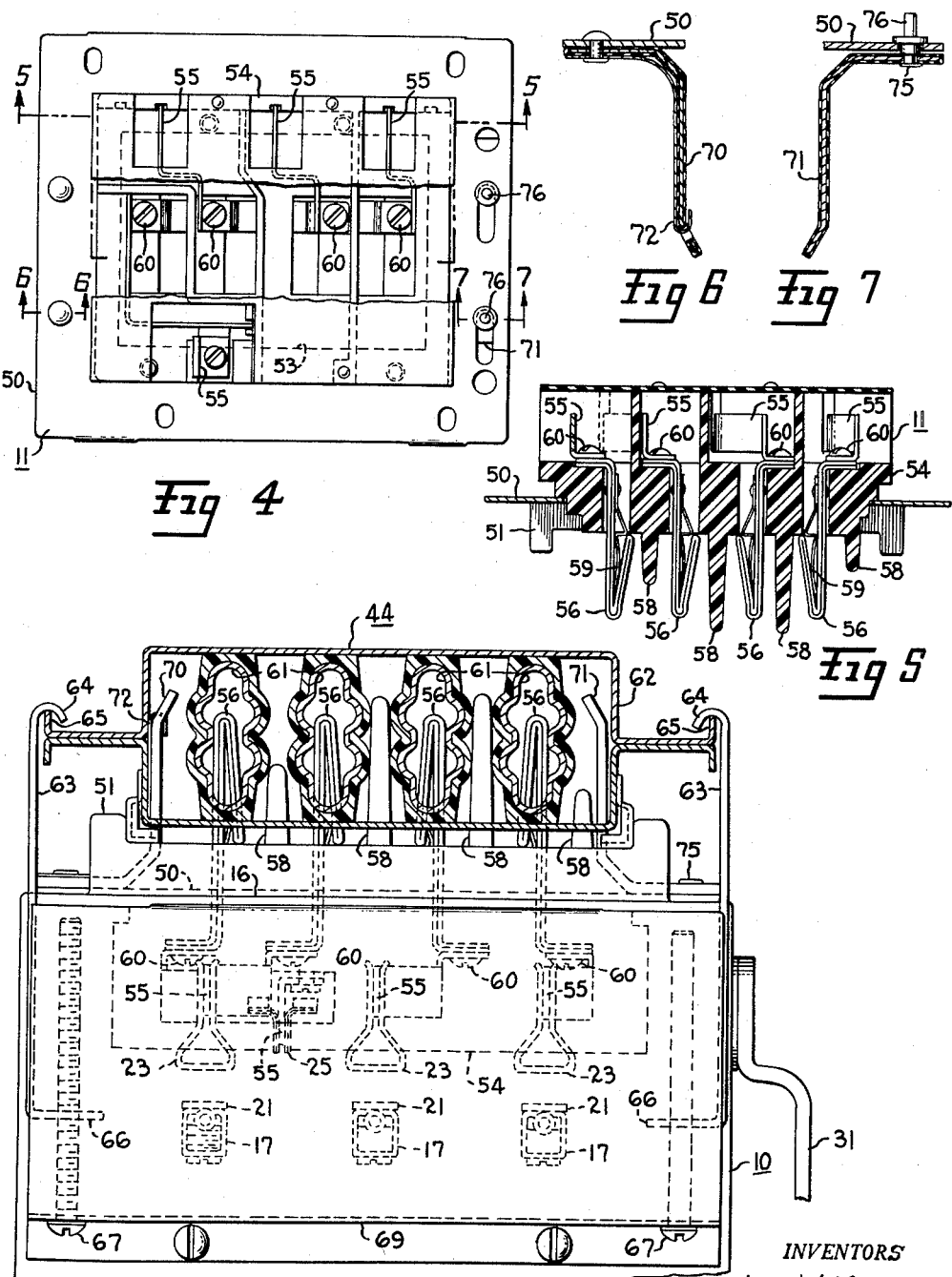

May 31, 1960  J. W. MEACHAM ET AL  2,938,971
PLUG-IN BUSWAY SYSTEM
Filed Nov. 21, 1958  4 Sheets-Sheet 4

INVENTORS
John W. Meacham,
Cecil B. Turton
BY Robert H. Casey
ATTORNEY

United States Patent Office 2,938,971
Patented May 31, 1960

2,938,971

PLUG-IN BUSWAY SYSTEM

John W. Meacham, Windsor, and Cecil B. Turton, Burlington, Conn., assignors to General Electric Company, a corporation of New York Filed Nov. 21, 1958, Ser. No. 775,648

6 Claims. (Cl. 200—51)

Our invention relates to electric power distribution systems of the bus bar type which are adapted to receive electric power take-off and control devices by plug-in engagement.

Electric power distribution systems of the busway type include prefabricated lengths or sections each comprising a generally elongated rectangular duct or housing, usually of metallic material, and a number of electric power bus bars supported in insulated relation therein. Electric power busway systems which are of the plug-in type also include means for making contact with the enclosed bus bars, at intermediate points of each such prefabricated length of busway, by means of a plug device having contacts adapted to enter the busway housing and to contact the bus bars contained therein. The plug device ordinarily includes a box-like enclosure having terminals for connecting a power cable leading to a power utilization device and also circuit control or protective equipment such as a circuit breaker, a switch, or a combination of switch and fuse means.

In accordance with prior practice, it has been necessary to provide distinct and different plug-in type power take-off devices for use with busway systems. Since it is common practice for a manufacturer to continue to manufacture and make available the preceding busway design along with the new busway design, at least for a number of years, before the changeover to a new design can become completely effected, there has arisen a large number of different plug-in type devices, each series being particularly tailored for a particular busway design and being usable only with that particular design. In recent years this situation has been aggravated by the need for specialized types of busway so that in a typical situation, a busway manufacturer is required to manufacture and make available six different busway designs, each having its own particular type of plug-in devices. The existence of such a large number of different types of plug-in devices greatly increases the cost of manufacture of such plug-in devices and the cost of cataloging, stocking and supplying this number of different devices.

It is an object of the present invention to provide a line of busway plug devices which comprise a basic standardized plug which can be used with any desired one of a number of different busway systems.

It is another object of the invention to provide a line of busway plug devices which comprise a basic plug body and a bus bar contact portion which is removable and replaceable to provide a plug device usable with a desired particular busway system.

It is a further object of the invention to provide such a removable and replaceable contact assembly which is easily and quickly removable and replaceable by a plug-in contact action with the basic plug body.

It is a further object of the invention to provide a plug device which is readily usable with a desired one of a plurality of different busway systems and which includes mechanical means for mechanically attaching the plug to a desired one of a different number of busway housings, even though such housings differ greatly in physical size.

It is a further object of the invention to provide a busway plug device including a removable contact assembly to render it usable with a selected one of a number of busway systems, which also has interlocking means to prevent removal of the plug device from the busway when a control device contained in the plug is in a predetermined position.

Further particular objects of the invention will, in part, become obvious and, in part, be pointed out in the following detailed description, and the scope of the invention will be particularly set forth in the appended claims.

In accordance with the invention, we provide a busway plug device comprising a generally box-like enclosure containing a plurality of terminals for connection to external conductors, a first set of contacts carried by the enclosure, and a removable contact portion comprising a supporting member adapted to be supported on the box-like enclosure and containing two sets of contacts, one set of contacts being disposed and arranged to contact the first set of contacts carried by the enclosure and a second set of contacts disposed and arranged to contact bus bars within a busway housing.

In accordance with another aspect of the invention, a removable contact assembly is provided incorporating an interlocking element for interlocking engagement with a busway housing, and means for releasably connecting the interlocking element to a busway plug mechanism to provide an interlocking means operable by the plug mechanism.

In accordance with another aspect of the invention, hanging means is provided for supporting the busway plug device body on any one of a plurality of busway housings, the hanging means being adjustable at right angles to the back wall of the plug device and also in a direction generally parallel to such back wall, whereby the plug device body may be supported on busway housings of varying height and width.

Our invention will be more clearly understood from the following detailed description taken in conjunction with the appended claims.

In the drawings:

Figure 3 is an exploded perspective view of the main portions of the plug device shown in Figures 1 and 2;

Figure 4 is a plan view of the removable contact assembly of the plug device of Figures 1–3;

Figure 5 is a sectional view of the removable contact assembly of Figure 4 taken on the lines 5—5 of Figure 4;

Figure 6 is a fragmentary sectional view of the device of Figure 4 taken on the lines 6—6 of Figure 4;

Figure 7 is a fragmentary sectional view taken on the lines 7—7 of Figure 4;

Figure 8 is a sectional elevation view of the basic plug device of Figures 1–3 shown in mounted position and taken generally on the lines 8—8 of Figure 1;

Figure 9:
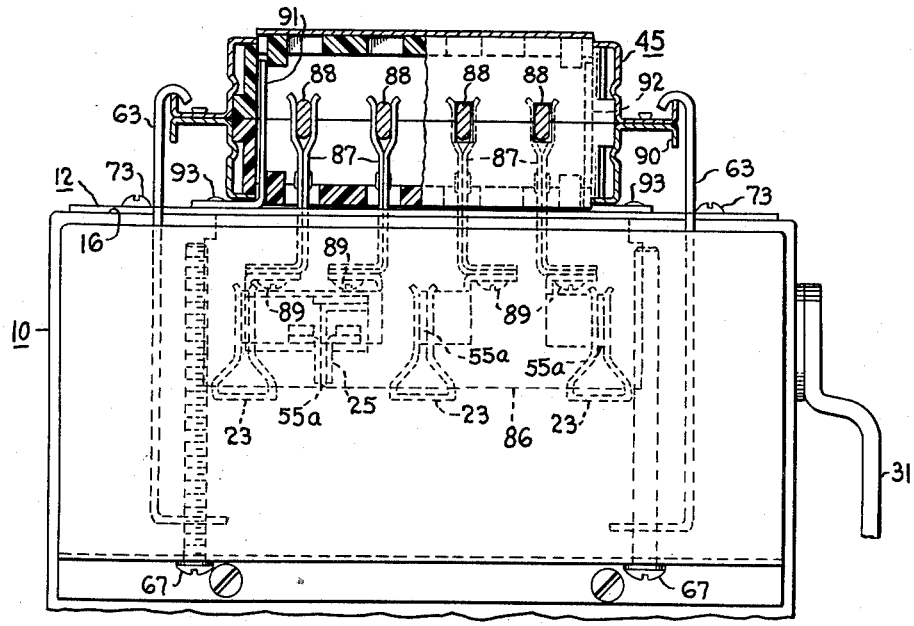
Figure 9 is a view similar to Figure 8 but showing the basic plug device used with a different removable contact assembly and used in conjunction with a different type of busway system.
Figure 10:
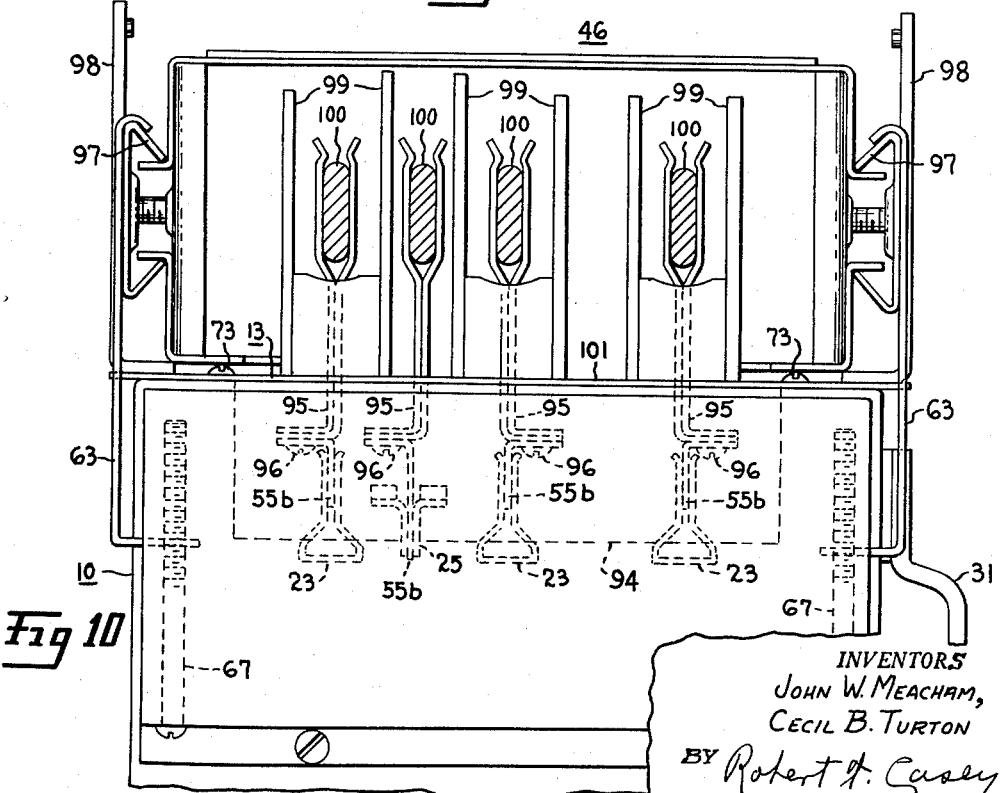
Figure 10 is a view similar to Figure 8 but showing the basic plug device with a still further type of removable contact assembly and used in connection with a still further type of busway system.

The invention is shown as incorporated in a busway plug device comprising a basic or standardized plug body 10 and a selected one of a series of removable external contact assemblies 11 (see Figures 4 and 5) 12 (see Figure 9), and 13 (see Figure 10).

Referring first to the plug device provided by the combination of the basic plug body 10 and the removable contact assembly 11, shown in Figures 1–8, the basic plug device 10 comprises a generally box-like enclosure comprising a body portion 10a and a cover portion 14 hingedly supported on one side thereof as at 15, and having a back wall 16.

A plurality of load terminals 17 are supported within the enclosure 10 in insulated relation, by suitable means such as by being supported on an insulating block 18 which is, in turn, supported upon a rigid strap 19 extending between the side walls of the enclosure 10 and rigidly attached thereto by suitable means such as by riveting. The load terminals 17 are connected by means of suitable electrical conductors 20 to an external power utilizing device, not shown. The terminals 17 are connected by means of connecting straps 21 and through the agency of individual switching devices 22, to sockets 23. In addition, a neutral or ground terminal 24 is provided connected directly to a corresponding neutral or ground socket 25.

For the purpose of selectively connecting and disconnecting the terminals 17 to and from the sockets or terminals 23, switching means is provided comprising an assembly of individual switching units 22. Each of the switching units 22 includes a pair of stationary contact members 26 and a movable generally U-shaped bridging contact member 27 which is adapted to be moved into and between the stationary contacts 26 to bridge them in the normally closed position of the switch. One of the stationary contact members 26 is connected to a corresponding socket member 23, while the other stationary contact 26 is connected to a fuse terminal 28a which, in turn, is connected through the agency of a fuse to the other fuse terminal 28b which, in turn, is connected to the connecting strap 21 electrically in common with the input or load terminal 17. Thus it will be observed that with the U-shaped movable contact 27 in contact bridging position, the input terminal 17 is connected to the output socket 23, and when the U-shaped contact member is in open position, the terminal 17 is disconnected from the terminal 23. The contact members 27 of all the individual switching units 22 are ganged together by a common operating yoke or crank member 29 having an insulating sleeve 30 thereon.

The yoke members 29 and 30 are operated to cause actuation of the switches by means of a suitable switch operating mechanism comprising a manually engageable handle 31 pivotally supported on the side wall of the enclosure 10 by means of a rotatable hub member 32 pivotally mounted on the side wall of the enclosure 10 and having a compression type overcenter spring 33 connected thereto at a point eccentric thereof to accelerate the action of the operation of the switching members. An interlock lever 34 is also provided, pivotally mounted on the side wall of the enclosure 10 at 35, and biased by tension spring 36 in a clockwise direction. The lever 34 has a hook portion 37 engageable with the hub portion 32 of the manually operable member at one end, and a slot 38, cut at an angle therein at the other end, adapted to coact with a pin 39 carried by the cover 14. The interlock lever 34 operates so as to prevent opening of the cover 14 when the switch member 29 is in the "on" position, but permits opening of the cover when the switch member is in the "off" position. A spring-type cover catch 40 is also provided, pivotally mounted on the side wall of the enclosure 10 and biased to engaging position by a tension spring 41. The construction and operation of the switching devices 22 including the manually operable mechanism and interlock lever 34 and catch 40 are all conventional and other suitable forms of switching device and operating means may, of course, be utilized.

Referring specifically to Figures 4 and 5, the removable contact assembly 11 comprises a supporting plate 50 having end portions 51 and 52 bent upwardly from the general plane thereof and having an enlarged, generally central, aperture 53 in which an insulating base assembly 54 is supported, having portions extending at both sides of the supporting plate 50. The insulating plate 54 has a first set of contacts 55 supported in a first spaced relation on one side thereof, and a second set of contacts 56 each connected to a corresponding one of the contacts 55 and spaced in a second predetermined relation at the other side by suitable means, such as by bolts 60. The insulating base 54 also includes integral insulating barrier portions 57 and 58, respectively, extending between the contacts 55 and 56, respectively. The contacts 56 comprise stab-type contacts having the end portions thereof return-bent to form two opposed resiliently movable contact portions, which are resiliently biased away from each other by the action of spring strip members 59.

When the assembled plug used in conjunction with a busway of the type illustrated at 44, as shown, for instance, in Figure 8, the stab-type contacts 56 enter into and make contact with the inner walls of generally tubular bus bar conductors 61, while the contact portions 55 enter between the jaw portions of the contact sockets 23 of the plug body 10. The screws 60 which serve to connect the contacts 55 to the contacts 56 also serve to anchor both of these parts to the insulating base member 54 by means of threaded engagement with a metallic tapped insert, not shown, embedded in the insulating base 54.

For the purpose of mechanically attaching the plug body 10 to the housing 62 of the busway 44, there is provided a pair of elongated hanger members 63 having their outer ends return-bent at 64 to engage flange portions 65 of the housing 62. The hanger members 63 have their inner portions 66 bent at an angle thereto and threadedly engage elongated clamping bolts 67 which pass through elongated slots 68 in end brackets 69 carried by the plug housing 10, see Figures 1 and 2 especially.

Figure 1:
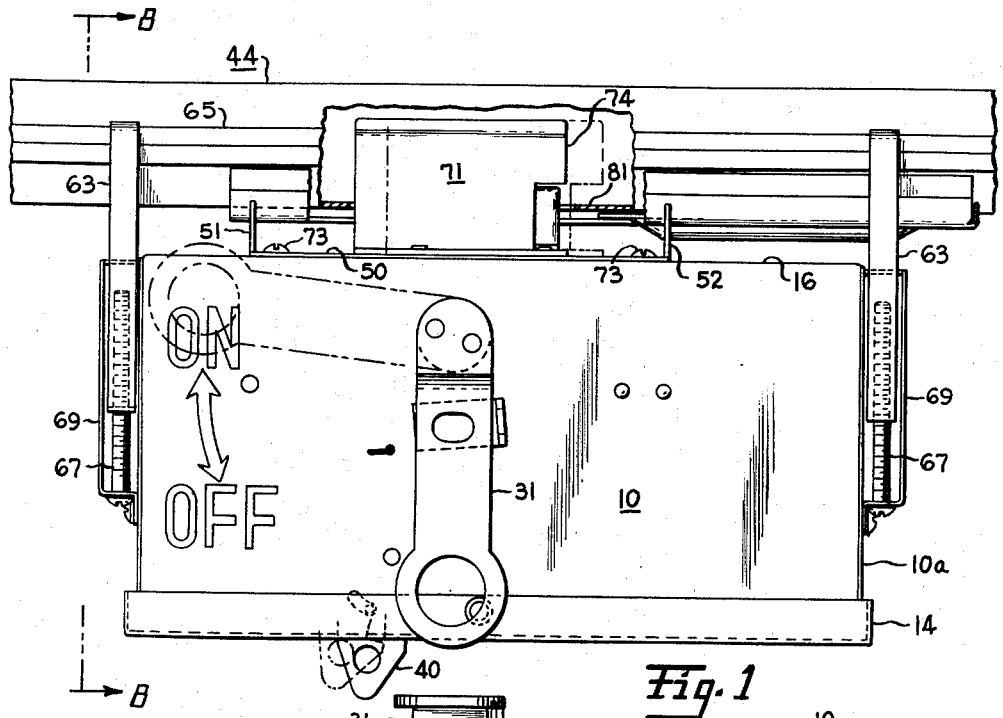
Figure 1 is a side elevation view of a busway plug device shown in mounted position on a busway housing, a portion of the busway housing being broken away.
Figure 2:
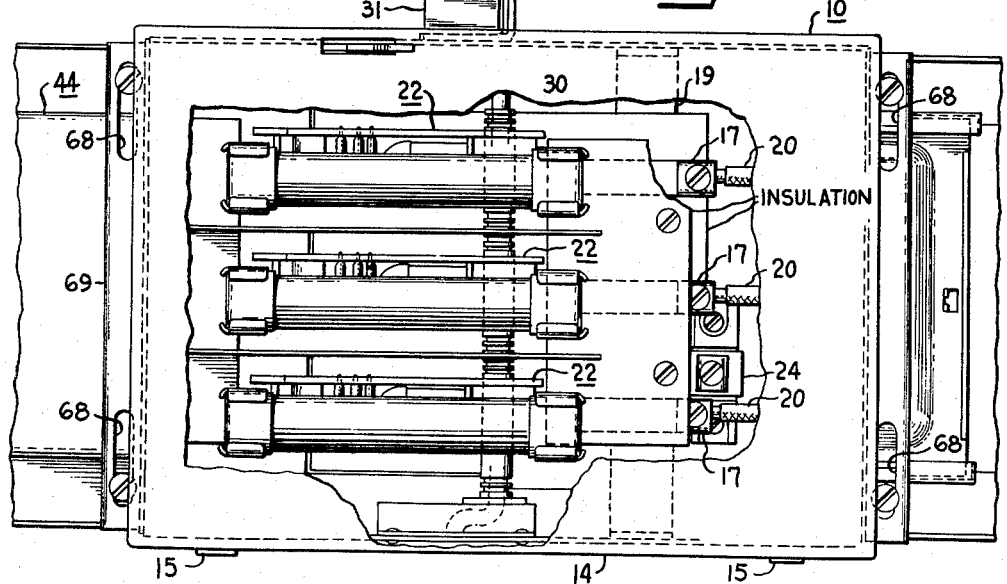
Figure 2 is a plan view looking upwardly at the front of the mounted plug device of Figure 1, a portion of the plug device enclosure cover being broken away to show the interior.

The supporting plate 50 of the removable contact assembly 11 is rigidly attached to the back wall 16 of the device enclosure 10 after the contacts 55 are placed in engagement with the contacts 23 by means of bolts 73, see Figure 1.

For the purpose of guiding the contacts 56 into proper engagement with the bus bars 61, and for protecting the contacts 56 from damage when the plug device is being shipped and handled, a pair of side barrier members 70 and 71 are provided carried by the supporting plate 50. Each of the barriers 70 and 71 comprises an angular piece of sheet metal having a coating of insulating material firmly bonded to the outside surfaces thereof, such, for instance, as an epoxy resin material. The barrier member 70 in addition, has a metallic grounding strip 72. When the plug device 10 is inserted on the busway housing 44 as shown in Figure 8, the barriers 70 and 71 enter corresponding openings in the wall of the busway and ride along the inner surfaces of the side walls of the busway, the grounding strip 72 making contact with the exposed edge of the openings as the device is inserted.

For the purpose of providing an interlock to prevent the removal of plug device 10 when the switch handle 31 is in the "on" position, one of the barriers, 71 is provided with an offset portion 74, see Figure 1, and the barrier 71 is slidably mounted on the supporting plate 50 by means of rivets 75 extending through elongated apertures or slots 76 in the supporting plate 50, as shown particularly in Figure 4. The rivets 75 include an elongated projecting portion 76. The plug device 10 includes along the side wall adjacent the manually operating member mechanism a sliding angle piece 77 which is slidably supported for movement along the back wall 16 by suitable means such as by rivets 78 and also includes circular apertures 79 registering with elongated apertures or slots 80 in the back wall 16 of the enclosure. When the removable contact assembly 11 is mounted on the back wall of the plug device 10, the projecting portions 76 of the rivets 75 register with and enter the apertures 79 in the sliding angle piece 77 so that such sliding movement of the angular piece 77 thereafter causes corresponding longitudinal movement of the barrier 71. It will be observed that when the barrier 71 is displaced longitudinally as indicated in dotted lines in Figure 1, the projecting portion 74 of the barrier overlies a portion 81 of the wall of the enclosure 62 of the busway 44. It is, therefore, impossible to withdraw the plug device 10 when the barrier is in this position. It is necessary, therefore, to throw the manually operating handle member to the opposite position in which the bracket member 82 carried by the hub member 32 engages the angle piece 77 and slides it longitudinally to its original position as indicated in solid lines, withdrawing the barrier member to its original position to allow it to move outwardly of the busway enclosure.

This interlock construction is an improvement upon the construction disclosed and claimed in prior application Serial Number 759,353, filed September 5, 1958, by C. B. Turton and assigned to the same assignee as the present invention.

In Figures 9 and 10 the basic plug device 10 is shown as used with removable contact assemblies constructed in accordance with the construction described in Figures 1–8, but having external contact members of different design and spacing in order to cooperate with and contact bus bar conductors utilized in different types of busway systems.

In Figure 9, the invention is shown as incorporated in a plug device having a basic standard body portion 10 as described above and a removable contact portion 12 comprising a supporting plate 85 rigidly connected to the back wall 16 of the plug body 10 by suitable means such as by screws 73 and carrying an insulating body 86. The insulating base 86 is attached to the supporting plate 85 by suitable means such as by rivets, not shown. The insulating base 86 carries interior contact members 55a corresponding to the contact members 55 of the form of the invention shown in Figure 8, and arranged to cooperate with the stationary contact sockets 23 of the plug device 10. The contacts 55a are connected to external contact members 87 which terminate in spaced contact jaw portions adapted to engage and contact bus bar conductors 88 of the busway 45. The contacts 55a are connected to the contacts 87 by means of screws 89 which also serve to anchor both of these contact members to the insulating body 86. The hanger members 63 engage flange portions 90 of the busway 45 and are clamped by bolts 67 in the manner previously described.

It will be observed that in this form the bus bars 88 are of a quite different design and arrangement from the bus bars 61 of the form of Figures 1–8 and that the overall size and dimensions of the busway housing 45 are considerably smaller than the corresponding busway housing 44.

Barriers 91 and 92 preferably of insulating material such as nylon are provided rigidly attached to the supporting plate 85 by suitable means such as by rivets 93. It will be observed that the barrier members 91 and 92, which correspond to the barrier members 70 and 71, are both rigidly attached and do not slide. Despite these differences, the plug body 10 is identical in all respects to the plug body 10 of the form of Figures 1–8.

In Figure 10 the invention is shown as incorporated in a plug device having a housing 10 corresponding to the housing 10 in the previous forms and including a removable contact assembly 13 having a supporting plate 101 attached to the back wall of the enclosure 10 by suitable means such as by rivets 73 and carrying an insulating body 94 which is suitably attached to the plate 101 by suitable means such as by rivets, not shown. External contacts 95 are provided which terminate in spaced contact jaw portions and are connected by means of bolts 96 to internal contact portions 55b which cooperate with contact jaws 23 in the manner previously described. The hanger clamps 63 also engage flange portions 97 of the enclosure housing of the busway enclosure 46 in a manner previously described.

In this form, barrier members 98 are also provided for the purpose of protecting the projecting stab members and for guiding the plug when it is being assembled, the barrier members 98 extending alongside of and outwardly of the flange portions 97 of the enclosure 46. The insulating base 94 includes projecting barrier portions 99 which also extend into the busway enclosure to separate the contact portions of the bus bars 100.

It will be observed that, in accordance with the invention, to provide a busway plug for use with any of the three busway systems disclosed, it is necessary only to stock a single type of basic busway plug device body 10 and a number of removable contact assemblies 11, 12 and 13, the desired contact assembly being selected for the type of busway plug device body needed. It is also possible to salvage plug devices when a busway system of one type is replaced with a busway system of another type. It is likewise possible to utilize the busway plug devices provided for a new type of busway system just introduced to continue to provide the needs of busway systems which have been previously installed, so that no such system is rendered obsolete.

The busway system illustrated in the form of the invention shown in Figures 1–8 is similar to that disclosed in application Serial Number 737,934, filed May 26, 1958, by Frank Johnston and Paul Krauss and assigned to the same assignee as the present invention. The busway system illustrated in Figure 9 is similar to that disclosed in application Serial Number 769,213, filed November 23, 1958, by J. W. Meacham, and assigned to the same assignee as the present invention. The busway system disclosed in Figure 10 is similar to that shown in Patent No. 2,341,841, issued February 15, 1944, to E. T. Carlson and assigned to the same assignee as the present invention.

While the invention has been shown only in a particular embodiment, it will be readily appreciated that many modifications thereof may readily be made by those skilled in the art. It is therefore intended by the appended claims, to cover all such modifications as fall within the true spirit and scope of the invention.

What we claim as new and desire to secure by Letters Patent of the United States is:

1. An electric power busway plug device comprising a generally box-like enclosure having a back wall, a first set of relatively stationary contacts mounted in insulated relation in said enclosure, an aperture in said back wall, a removable contact assembly comprising a body of insulating material, a plurality of individual contact members mounted in insulated relation on said body of said insulating material and including first contact portions adapted to contact said relatively stationary contacts and second contact portions adapted to contact bus bars of a busway power distribution system, means for mounting said removable contact assembly on said back wall of said main enclosure with a portion of said insulating body projecting through said aperture, and with said first contact portions of said removable contact assembly releasably retained in electrically contacting engagement with said relatively stationary contacts.

2. An electric power busway plug device comprising a basic body portion including a generally box-like enclosure having a back wall, a first set of plug-in type electric contacts mounted in insulated relation within said enclosure, an aperture in said back wall, a removable contact assembly comprising a generally planar supporting plate member of metallic material having an enlarged generally central aperture, a body of insulating material mounted on said supporting plate and including a portion extending into said aperture and having portions extending at either side of said mounting plate, said removable contact assembly including a plurality of first contact portions projecting from one side thereof and disposed and arranged to make plug-in contact with said stationary contacts in said enclosure and a second set of contacts projecting from the other side thereof for making plug-in type electrical engagement with corresponding bus bars of a busway system, means connecting said first and second contact portions together and to said insulating supporting base, and means for rigidly attaching said removable contact assembly to said generally box-like enclosure of said plug device.

3. A busway plug device comprising a generally box-like main enclosure having a back wall, a plurality of individual plug-in type electric contact terminals supported in insulated relation within said enclosure, a removable contact assembly adapted to be mounted on said back wall of said enclosure and including an insulating body and a plurality of electric contact elements, each of said contact elements having an outer portion for making plug-in contact with an electric power bus bar of a busway system and an inner portion for making contact with one of said plug-in type contacts of said enclosure, means rigidly mounting said contact elements on said insulating body, and means for removably attaching said contact assembly to said back wall of said enclosure with said contact portions of said removable contact assembly in contact with said stationary contact portions within said enclosure.

4. An electric power busway plug device comprising a generally box-like enclosure having a generally planar back wall, an enlarged aperture in said back wall, a plurality of stationary contacts mounted in insulated relation within said enclosure, terminal connecting means for connecting electrical conductors to each of said contacts in said enclosure, said contacts and said conductor connecting means being contained entirely within said generally rectangular enclosure so that no part thereof projects outwardly through said aperture beyond the plane of said back wall of said enclosure, a removable external contact assembly comprising a generally planar supporting member adapted to be mounted on said back wall of said enclosure, a block of insulating material carried by said generally planar supporting member and adapted to overlie said aperture in said back wall of said plug device and including a portion projecting into said plug device, a plurality of electrically independent contact elements mounted on said insulating body and including portions projecting into the interior of said enclosure and outwardly thereof, each of said contacts including a first portion adapted to make contact with said stationary contacts within said enclosure and a second portion adapted to make plug-in type contact with electric power bus bars of a busway power distribution system, and means for removably attaching said mounting plate to said back wall of said enclosure.

5. Electrical apparatus comprising a generally box-like enclosure having a generally planar back wall, an enlarged aperture in said back wall, a plurality of electrically independent relatively stationary plug-in type contacts supported within said enclosure, a plurality of electric terminal connecting means for connecting an electrical connector to each of said plug-in type contacts within said enclosure, means for supporting said box-like enclosure on the housing of a busway power distribution system, electric power connecting means comprising a removable contact assembly including a first removable contact assembly comprising a supporting plate having an insulating body mounted in an aperture therein, and adapted to be mounted on the back wall of said box-like enclosure with a portion of said insulating body projecting within said busway device enclosure, and including a plurality of electric contact elements, each of said elements having a first portion adapted to contact said stationary contacts within said box-like enclosure of said plug device when said assembly is mounted on said back wall, and a second portion adapted to contact electric power bus bars of a busway distribution system, and a second removable contact assembly comprising a supporting plate, a body of insulating material mounted on said supporting plate, a plurality of electric contact elements mounted on said insulating material and including a first portion adapted to make contact with said contact portions in said box-like enclosure and a second set of contact elements adapted to make contact with electric power bus bars of a busway power distribution system, said bus bar contacting portions of said contact elements of said second removable contact assembly being disposed in a configuration different from that of the corresponding contact portions of said first removable contact assembly whereby either of said removable contact assemblies may be utilized with said box-like enclosure portion to provide a busway power plug device usable with a selected one of two different types of busway systems.

6. An electric power distribution system comprising an elongated generally rectangular enclosure, a plurality of electric power bus bars supported in generally side-by-side parallel insulated relation within said enclosure, at least one aperture in a wall of said enclosure permitting access to said bus bars, a contact assembly comprising an insulating base, a first set of contacts carried by said insulating base and each extending into plug-in contact with a corresponding one of said bus bars, a second set of contacts carried by said insulating base and connected to said first set of contacts respectively, a generally rectangular control device enclosure supported on said elongated housing, a plurality of contacts supported in said control device enclosure each of said control device contacts being in plug-in engagement with one of said second set of contacts, and terminal means for connecting an external conductor to each of said control device contacts.

References Cited in the file of this patent

UNITED STATES PATENTS

| | | |
|---|---|---|
| 2,059,987 | Frank et al. | Nov. 3, 1936 |
| 2,124,269 | Anderson et al. | July 19, 1938 |
| 2,281,221 | Anderson | Apr. 28, 1942 |
| 2,317,710 | Anderson | Apr. 27, 1943 |
| 2,805,294 | Edmunds | Sept. 3, 1957 |